US012515134B2

(12) United States Patent
Weng et al.

(10) Patent No.: US 12,515,134 B2
(45) Date of Patent: Jan. 6, 2026

(54) ENABLING OF ASSIST FUNCTION

(71) Applicant: TENCENT TECHNOLOGY (SHENZHEN) COMPANY LIMITED, Guangdong (CN)

(72) Inventors: Ersen Weng, Shenzhen (CN); Jing Liu, Shenzhen (CN); Liman Wu, Shenzhen (CN); Yajun Guan, Shenzhen (CN); Ce Qian, Shenzhen (CN); Yukuan Fang, Shenzhen (CN)

(73) Assignee: TENCENT TECHNOLOGY (SHENZHEN) COMPANY LIMITED, Shanzhen (CN)

( * ) Notice: Subject to any disclaimer, the term of this patent is extended or adjusted under 35 U.S.C. 154(b) by 311 days.

(21) Appl. No.: 18/316,780

(22) Filed: May 12, 2023

(65) Prior Publication Data

US 2023/0277937 A1 Sep. 7, 2023

Related U.S. Application Data

(63) Continuation of application No. 17/232,115, filed on Apr. 15, 2021, now Pat. No. 11,684,856, which is a (Continued)

(30) Foreign Application Priority Data

Feb. 28, 2019 (CN) ......................... 201910153433.3

(51) Int. Cl.

*A63F 13/57* (2014.01)
*A63F 13/22* (2014.01)
(Continued)

(52) U.S. Cl.

CPC .............. *A63F 13/57* (2014.09); *A63F 13/22* (2014.09); *A63F 13/422* (2014.09); (Continued)

(58) Field of Classification Search

CPC ........ A63F 13/57; A63F 13/22; A63F 13/422; A63F 13/803; A63F 2300/64; A63F 2300/8017
(Continued)

(56) References Cited

U.S. PATENT DOCUMENTS 6,652,376 B1 11/2003 Yoshida et al.
7,625,287 B2 12/2009 Champagne et al.
(Continued)

FOREIGN PATENT DOCUMENTS

CN 108595022 A 9/2018
CN 108635855 A 10/2018
(Continued)

OTHER PUBLICATIONS

International Search Report in PCT/CN2020/072802, mailed Apr. 15, 2020, 4 pages.
(Continued)

*Primary Examiner* — Allen Chan
(74) *Attorney, Agent, or Firm* — ArentFox Schiff LLP

(57) ABSTRACT

In a method of enabling an assist function, the assist function is enabled based on an execution history of a second operation that is to be performed by a virtual object in a virtual environment after a first operation is performed by the virtual object. The assist function is configured to automatically perform the second operation after the first operation. A first user input to perform the first operation by the virtual object is received. The second operation is automatically performed by the virtual object after the first operation is performed by the virtual object based on the assist function being enabled.

20 Claims, 11 Drawing Sheets

Related U.S. Application Data continuation of application No. PCT/CN2020/072802, filed on Jan. 17, 2020.

(51) Int. Cl.
*A63F 13/422* (2014.01)
*A63F 13/803* (2014.01)

(52) U.S. Cl.
CPC ........ *A63F 13/803* (2014.09); *A63F 2300/64* (2013.01); *A63F 2300/8017* (2013.01)

(58) Field of Classification Search
USPC ........................................................ 463/6
See application file for complete search history.

(56) References Cited

U.S. PATENT DOCUMENTS

| | | | | |
|---|---|---|---|---|
| 8,075,404 | B2 * | 12/2011 | Stamper .............. | G07F 17/3276 463/42 |
| 8,523,678 | B2 | 9/2013 | Yamashita et al. | |
| 2006/0068921 | A1 * | 3/2006 | Cheng ................... | A63F 13/422 463/51 |
| 2007/0265087 | A1 | 11/2007 | Akahori et al. | |
| 2009/0061972 | A1 | 3/2009 | Tipping et al. | |
| 2014/0221066 | A1 * | 8/2014 | McCord .................. | A63F 9/183 463/9 |
| 2018/0104584 | A1 | 4/2018 | Utsugi | |

FOREIGN PATENT DOCUMENTS

| | | | |
|---|---|---|---|
| CN | 108654085 | A | 10/2018 |
| CN | 108744518 | A | 11/2018 |
| CN | 108939546 | A | 12/2018 |
| CN | 109107152 | A | 1/2019 |
| CN | 109806586 | A | 5/2019 |
| JP | H11123279 | A | 5/1999 |
| JP | 2004236799 | A | 8/2004 |
| JP | 2010201035 | A | 9/2010 |
| JP | 2011160864 | A | 8/2011 |
| JP | 2013070869 | A | 4/2013 |
| JP | 2018064767 | A | 4/2018 |
| KR | 20180070195 | A | 6/2018 |
| WO | 2018091861 | A1 | 5/2018 |
| WO | 2018137433 | A1 | 8/2018 |

OTHER PUBLICATIONS

MJ, "QQ Flying Car Game Keyboard Instructions," Jan. 4, 2018 [retrieved from the Internet on Apr. 15, 2021]. Retrieved from the Internet <URL:https://m.youxiniao.com/txyx/2640801.html>, 1 page.
Office Action in CN201910153433.3, mailed Feb. 18, 2021, 10 pages.
Office Action in JP2021516972, mailed May 24, 2022, 13 pages.
Written Opinion in PCT/CN2020/072802, mailed Apr. 15, 2020, 4 pages.

* cited by examiner

ENABLING OF ASSIST FUNCTION

RELATED APPLICATION

This application is a continuation of U.S. application Ser. No. 17/232,115, filed on Apr. 15, 2021, which is a continuation of International Application No. PCT/CN2020/072802, filed on Jan. 17, 2020, which claims priority to Chinese Patent Application No. 201910153433.3, entitled "GAME ASSIST FUNCTION ENABLING METHOD AND APPARATUS, DEVICE, AND READABLE STORAGE MEDIUM" and filed on Feb. 28, 2019. The entire disclosures of the prior applications are hereby incorporated by reference in their entirety.

FIELD OF THE TECHNOLOGY

Embodiments of this disclosure relate to the gaming field, including an assist function enabling method and apparatus, a device, and a readable storage medium.

BACKGROUND OF THE DISCLOSURE

Typically, a novice assist function is provided in a game. The novice assist function is configured to familiarize a novice player with operation modes of the game, and perform some operations in the game to cooperate with the player to finish the game.

In the related art, the novice player needs to enable the novice assist function in a setting interface, so that the player is assisted by the novice assist function during the game. Using a drift in a racing game as an example, after a drift operation is completed, the player needs to click/tap a nitrogen jet control to realize acceleration after the drift. When the player enables an automatic secondary jet function, the automatic secondary jet function can assist the player with acceleration using nitrogen when the player neglects to click/tap the nitrogen jet control.

However, the novice assist function provided in the setting interface is a fixed function, for example, the novice assist function provided in the setting interface in the racing game is the automatic secondary jet function, while an operation in which the novice player is not proficient during the game may not be an operation corresponding to the function provided in the setting interface. Therefore, the assistance accuracy of the novice assist function can be relatively low.

SUMMARY

Embodiments of this disclosure provide an assist function enabling method and apparatus, a device, and a readable storage medium, which can resolve the problem of relatively low assistance accuracy of a novice assist function.

According to one aspect, an assist function enabling method is provided. In the method, target data that is generated according to a target operation in a game application is obtained. A game assist function is enabled in response to the target data matching a trigger condition of an assist function trigger, the target data indicating an execution completion status of the target operation, and the game assist function being configured to assist in executing the target operation. The target operation is automatically executed, in the game application, according to the game assist function in a case that a game operation meets an execution condition of the target operation.

According to another aspect, an assist function enabling apparatus is provided. The apparatus includes processing circuitry that is configured to obtain target data that is generated according to a target operation in a game application. The processing circuitry is configured to enable a game assist function in response to the target data matching a trigger condition of an assist function trigger, the target data indicating an execution completion status of the target operation, and the game assist function being configured to assist in execution of the target operation. Further, the processing circuitry is configured to execute, in the game application, the target operation according to the game assist function in a case that a game operation meets an execution condition of the target operation According to another aspect, a computer device is provided, including a processor and a memory, the memory storing at least one instruction, at least one program, a code set or an instruction set, the at least one instruction, the at least one program, the code set or the instruction set being loaded and executed by the processor to implement the assist function enabling method according to the embodiments of this disclosure.

According to another aspect, a non-transitory computer-readable storage medium is provided, storing instructions which when executed by a processor cause the processor to perform the assist function enabling method according to the embodiments of this disclosure.

According to another aspect, a computer program product is provided, the computer program product, when run on a computer, causing the computer to perform the assist function enabling method according to the embodiments of this disclosure.

The technical solutions provided in the embodiments of this disclosure bring at least the following beneficial effects:

The target data corresponding to the target operation is matched against the trigger condition of the assist function trigger. When the target data meets the trigger condition of the assist function trigger, the game assist function is enabled. The game assist function is configured to assist in the target operation that triggers the function to be enabled. That is, after the game assist function is enabled, an operation to be executed with the assistance of the game assist function is the target operation that triggers the function to be enabled. The target data is used for representing the execution completion status of the target operation. When the target data indicates that the execution completion status of the target operation is relatively poor, the game assist function is triggered. That is, the assist function is enabled pertinently, which is enabled for the target operation with a relatively poor execution completion status in a gaming process. Therefore, both the game assistance accuracy and the assistance efficiency can be relatively high.

BRIEF DESCRIPTION OF THE DRAWINGS

To describe technical solutions of embodiments of this disclosure more clearly, the following briefly introduces the accompanying drawings required for describing the embodiments. The accompanying drawings in the following description show merely some embodiments of this disclosure, and a person of ordinary skill in the art may still derive other accompanying drawings from the accompanying drawings.

DESCRIPTION OF EMBODIMENTS

Figure 1:
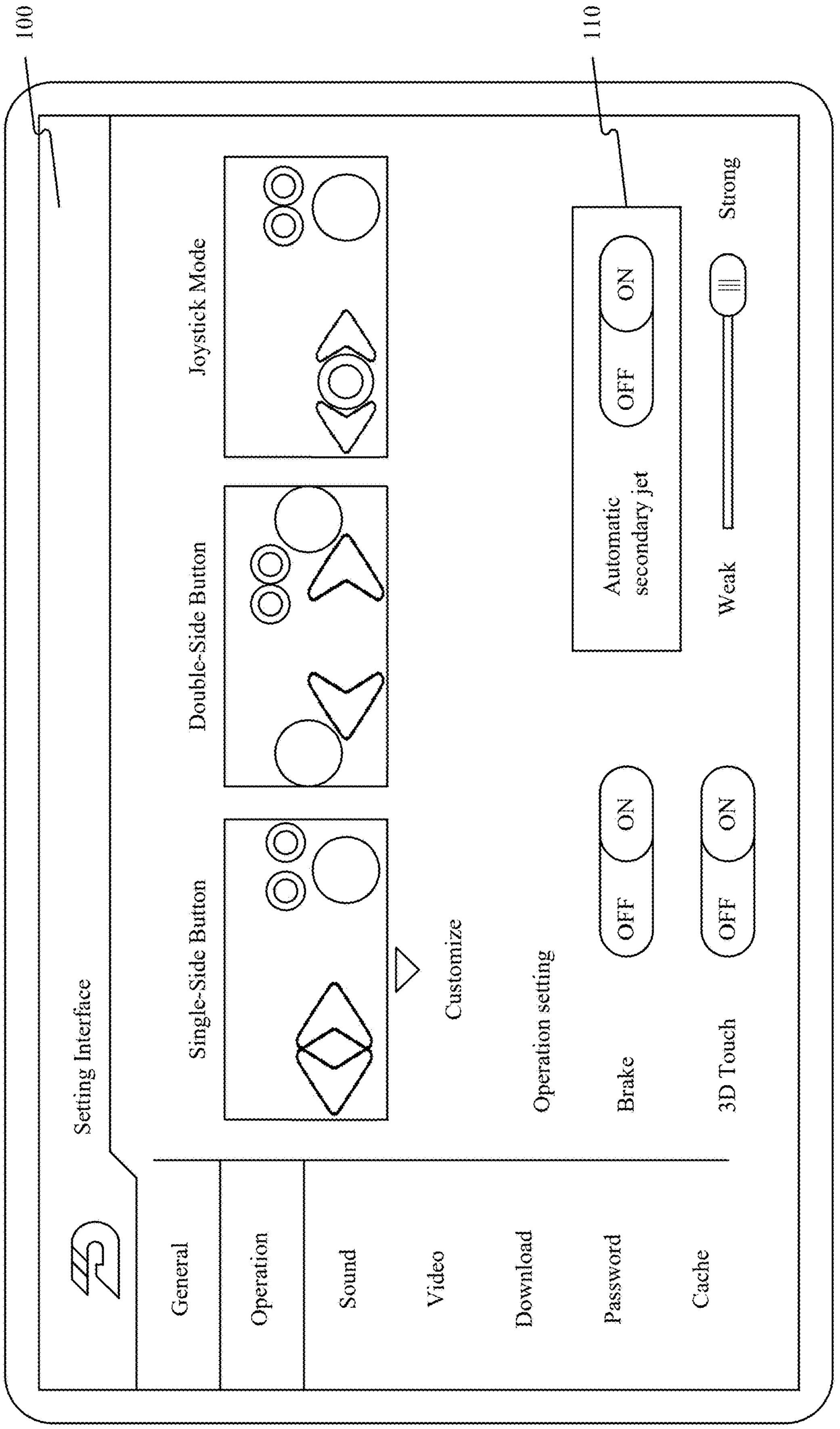
FIG. 1 is a schematic diagram of an interface of a game assist function in a game setting interface according to an exemplary embodiment of this disclosure.

To make objectives, technical solutions, and advantages of this disclosure clearer, implementations of this disclosure are further described below in detail with reference to the accompanying drawings.

First, terms in the embodiments of this disclosure are briefly described.

Game assist function is a function of assisting a player with an assist operation through a client to finish a game. Optionally, after the game assist function is enabled, the assist operation performed by the client to assist the player may be a complete game operation, a part of the game operation, or a preset target operation. Optionally, in the embodiments of this disclosure, description is made by using an example in which the player is assisted in executing the target operation after the game assist function is enabled. Optionally, after the game assist function is enabled, the client performs the assist operation according to a player operation of the player in a game battle. Optionally, the game assist function is applicable to a plurality of game applications. For example, the game assist function is applicable to a racing application. In the racing application, after a player triggers a drift operation to make a turn, a reverse steering control usually needs to be clicked/tapped to adjust a traveling direction of a racing vehicle. For example, after the player clicks/taps a left turn control and a drift control to perform a left drift, a right turn control needs to be clicked/tapped to rotate a direction of the racing vehicle to a track direction. When the game assist function is enabled, after the player performs the left drift, the client applies a rightward force to a head of the racing vehicle, so that the traveling direction of the racing vehicle is rotated to the track direction according to the force. That is, there is no need for the player to manually adjust the direction of the vehicle head after the drift.

Game data is data generated according to a player operation in a game battle. Optionally, the game data may include only game data of a current battle, and may also include historical data of a preset quantity of last battles, such as game data of the last three battles. Optionally, the game data includes target data generated according to a target operation, the target data being used for representing an execution completion status of the target operation. Optionally, the target data includes at least one of operation data and calculation data. The operation data includes an operation frequency of the target operation. For example, in game application such as a racing game battle, if a player clicks/taps a left turn control and a drift control, a generated operation is a left drift operation. After the drift operation, if the player clicks/taps a right turn control, a vehicle head back (or vehicle steer back) operation is generated. The operation data is used for representing a frequency of executing the vehicle head back operation after the drift operation. In the foregoing example, description is made by using the left drift operation as an example. The drift operation may alternatively be implemented as a right drift operation, that is, after the drift operation, the left turn control is clicked/tapped to generate a vehicle head back operation. Optionally, the operation data is mainly about the game operation of the player during the game. For example, in the racing game battle, the game operation data is mainly about an operation of the player to control the racing vehicle. That is, the game operation data does not include a setting operation performed by the player, such as a voice enabling operation or a voice disabling operation. Optionally, the calculation data is used for representing operation completion quality of the target operation. For example, in the racing game battle, if the right turn control is clicked/tapped after the left drift operation, the vehicle head back operation is generated. The calculation data is used for representing completion quality of the vehicle head back operation after the drift operation, that is, an angle between the racing vehicle and the track after the vehicle head back operation. Optionally, the target data is used for determining how proficient a target account is in the game.

Then, an application scenario of an assist function enabling method provided in the embodiments of this disclosure is described. The application scenario of the assist function enabling method provided in this disclosure includes at least one of the following application scenarios:

1. In a racing game, a player controls a racing vehicle by controlling a left turn control, a right turn control, and a drift control. If a vehicle head is not turned back a plurality of times after the player controls the racing vehicle to perform left drifts or right drifts, or the vehicle head is turned back but deflected a plurality of times in a process of turning back the vehicle head after the player controls the racing vehicle to perform left drifts or right drifts, for example, the vehicle head is turned back but deflected to the right after the left drift, the game assist function is enabled to assist the player in turning back the head of the racing vehicle after the drift.
2. In a third-person shooting (TPS) game or a first-person shooting (FPS) game, a player controls a virtual character to battle with a virtual gun. If the virtual character does not perform a clip supplement (e.g., reloading) operation on the virtual gun a plurality of times after shooting with the virtual gun, the game assist function is enabled to assist the player by automatically supplementing the clip after shooting.

The foregoing application scenarios are merely examples. The assist function enabling method provided in the embodiments of this disclosure can be applied to all scenarios in which a proficiency of a player in a game can be determined according to game data.

In the related art, an assist function usually needs to be enabled in a game setting, and then a client assists a player in finishing a game according to the enabled assist function. For example, referring to FIG. 1, a setting interface 100 of a racing game includes an automatic secondary jet setting option 110. When a player chooses to turn on the automatic secondary jet setting option 110, after the player completes a drift in a game battle, acceleration can be realized by using an automatic secondary jet without clicking/tapping a nitrogen control in a battle interface.

Figure 2:
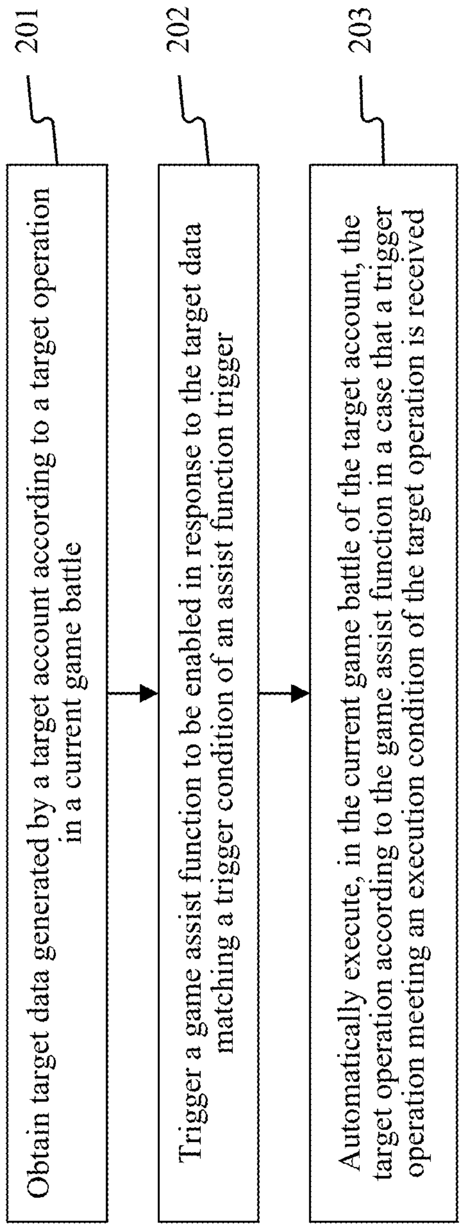
FIG. 2 is a flowchart of an assist function enabling method according to an exemplary embodiment of this disclosure.

With reference to the foregoing descriptions of terms and application scenarios, the assist function enabling method provided in the embodiments of this disclosure is described. The method is applicable to a terminal or a server. As shown in FIG. 2, the method can include the following steps.

In step 201, target data is generated by a target account according to a target operation in a current game battle.

For example, target data that is generated according to a target operation in a game application is obtained. Optionally, the target data includes data generated by the target account in the current game battle, and may further include historical data generated by the target account in a preset quantity of last battles, such as target data generated by the target operation in the last three battles. Optionally, the target data includes at least one of operation data and calculation data. The operation data includes an operation frequency of the target operation. Optionally, the operation data may further include a quantity of operation times of the target operation. For example, in a racing game battle, if a player clicks/taps a left turn control and a drift control, a generated operation is a left drift operation. After the drift operation, if the player clicks/taps a right turn control, a vehicle head back operation is generated. The operation data is used for representing a frequency of the vehicle head back operation after the drift operation. Optionally, the operation data is mainly about the game operation of the player during the game. That is, the game operation data does not include a setting operation performed by the player, such as a voice enabling operation or a voice disabling operation. Optionally, the calculation data is used for representing operation completion quality of the target operation. For example, in the racing game battle, if the right turn control is clicked/tapped after the left drift operation, the vehicle head back operation is generated. The calculation data is used for representing completion quality of the vehicle head back operation after the drift operation, that is, an angle between a racing vehicle and a track after the vehicle head back operation. Optionally, the target data is used for determining how much the target account is proficient in the game.

Optionally, when the target data includes only the data generated by the target account in the current game battle, the terminal caches game data generated by the target account in the current game battle, and directly obtains the target data from a cache area. When the target data includes only the data generated by the target account in the current game battle, or the target data includes the data generated in the current game battle and the historical data generated in the preset quantity of last battles, the terminal may obtain the target data from a server. For example, after sending a data obtaining request to the server, the terminal obtains historical data and data in the current game battle that are generated by the target operation and stored in the server. Optionally, in a game battle process, the terminal sends generated game data to the server in real time.

Optionally, the timing of obtaining the target data includes any one of the following cases:

1. The target data is obtained after a specified operation is executed, for example, after a drift operation is executed in a racing application, or after a shooting operation is executed in a shooting game.
2. The target data is obtained at a preset time interval.

In step 202, a game assist function to be enabled in response to the target data matching a trigger condition of an assist function trigger is triggered.

For example, a game assist function is enabled in response to the target data matching a trigger condition of an assist function trigger, the target data indicating an execution completion status of the target operation, and the game assist function being configured to assist in executing the target operation. Optionally, the target data is used for representing an execution completion status of the target operation, and the game assist function is configured to assist in executing the target operation. Optionally, the trigger condition of the assist function trigger includes the execution completion status of the target operation being lower than a preset completion status.

Optionally, the trigger condition is set in the assist function trigger, the trigger condition being used for matching against the target data, to determine whether the target data meets a requirement for enabling the game assist function.

Optionally, a plurality of groups of trigger conditions may be set in the assist function trigger, and game assist functions that are triggered to be enabled based on different groups of trigger conditions may be different. For example, when the target data matches a trigger condition 1, a game assist function A is triggered to be enabled; when the target data matches a trigger condition 2, a game assist function B is triggered to be enabled. Optionally, a single group of trigger conditions may include a plurality of trigger conditions. When at least one trigger condition in the single group of trigger conditions is met, the game assist function is enabled. Alternatively, when a preset quantity of trigger conditions in the single group of trigger conditions are met, the game assist function is enabled. Alternatively, when each trigger condition in the single group of trigger conditions is met, the game assist function is enabled.

Optionally, the target data includes at least one of operation data and calculation data, the operation data being used for representing an operation frequency of the target operation, and the calculation data being used for representing operation completion quality of the target operation. A status of matching between the target data and the trigger condition of the assist function trigger may be determined in any one of the following cases:

1. The game assist function is triggered to be enabled in response to the target data including the operation data, and the operation frequency of the target operation represented by the operation data being lower than a preset frequency. That is, whether the operation frequency of the target operation matches the preset frequency is determined.

For example, the method is applicable to a racing application. The target account is an account logged in to the racing application, and the target operation is a vehicle head back operation. When the target data includes operation data of the vehicle head back operation, and an operation frequency of the vehicle head back operation is lower than the preset frequency, the game assist function is triggered to be enabled. The operation frequency of the vehicle head back operation is calculated according to a received quantity of drift operations and a received quantity of vehicle head back operations. Optionally, the operation frequency of the vehicle head back operation is a ratio of the quantity of vehicle head back operations to the quantity of drift operations. For example, the preset frequency is 20%. When the operation frequency of the vehicle head back operation is lower than 20%, it is determined that the operation frequency of the target operation matches the preset frequency, and the game assist function is enabled.

2. The game assist function is triggered to be enabled in response to the target data including the calculation data, and a quantity of times of occurrence of data within a target data range in the calculation data reaching a preset quantity of times.

For example, the method is applicable to a racing application. The target account is an account logged in to the racing application, and the calculation data includes included angle data between a racing vehicle and a track. When the target data includes the calculation data, and a quantity of times that the angle between the racing vehicle and the track in the calculation data is greater than a preset angle reaches the preset quantity of times, the game assist function is triggered to be enabled. The angle between the racing vehicle and the track is obtained by determining an angle between a traveling (or movement) direction of the racing vehicle and a track direction after a drift operation and a vehicle head back operation are received. The angle between the racing vehicle and the track may also be understood as an angle between the traveling direction of the racing vehicle and the track. For example, the target data range is greater than 30°, and the preset quantity of times is three times. When a quantity of times that the angle between the racing vehicle and the track is greater than 30° reaches three times, it is determined that a quantity of times of occurrence of game calculation data within the target data range in the calculation data matches the preset quantity of times, and then the game assist function is enabled.

3. When the target data includes the operation data and the calculation data, the game assist function is triggered to be enabled in response to the operation frequency of the vehicle head back operation being lower than the preset frequency, and the quantity of times that the angle between the racing vehicle and the track in the calculation data is greater than the preset angle reaching the preset quantity of times.

4. When the target data includes the operation data, and a quantity of operation times of the target operation is lower than a preset quantity of operation times, the game assist function is triggered to be enabled.

5. When the target data includes the calculation data, and the quantity of times of occurrence of the data within the target data range in the calculation data is lower than the preset frequency, the game assist function is triggered to be enabled.

Optionally, the game assist function is a function of assisting a player with an assist operation through a client to finish a game. Optionally, the game assist function is configured to assist in executing the target operation.

In step 203, the target operation, in the current game battle of the target account, is automatically executed according to the game assist function in a case that a trigger operation meeting an execution condition of the target operation is received.

For example, the target operation is automatically executed, in the game application, according to the game assist function in a case that a game operation meets an execution condition of the target operation. Optionally, after the game assist function is enabled, the client performs an assist operation according to a player operation of the player in the game battle. Optionally, the trigger operation is an operation that triggers the target operation, that is, an operation executed before the target operation is executed in the game battle. For example, since the drift operation causes the vehicle head to deflect, the vehicle head back operation is used as the target operation, and the drift operation before the vehicle head back operation is a trigger operation of the vehicle head back operation. Alternatively, since bullets are insufficient after a shooting operation, a clip supplement operation is used as the target operation, and the shooting operation before the clip supplement operation is a trigger operation of the clip supplement operation.

Optionally, the game assist function is applicable to the racing application. For example, when the game assist function is enabled, after the player performs a left drift, the client applies a rightward force to the head of the racing vehicle, so that the traveling direction of the racing vehicle is rotated to the track direction according to the force. That is, there is no need for the player to manually adjust the direction of the vehicle head after the drift.

Optionally, the game assist function is a function applicable to the current game battle. The game assist function is also applicable to another game battle of the target account. For example, the game assist function is applicable to a game battle that is started after the current game battle.

Optionally, after the game assist function is enabled, the player may disable the game assist function in a setting interface, or the game assist function may be automatically disabled through the client according to the target operation. This is not limited in the embodiments of this disclosure.

Figure 3:
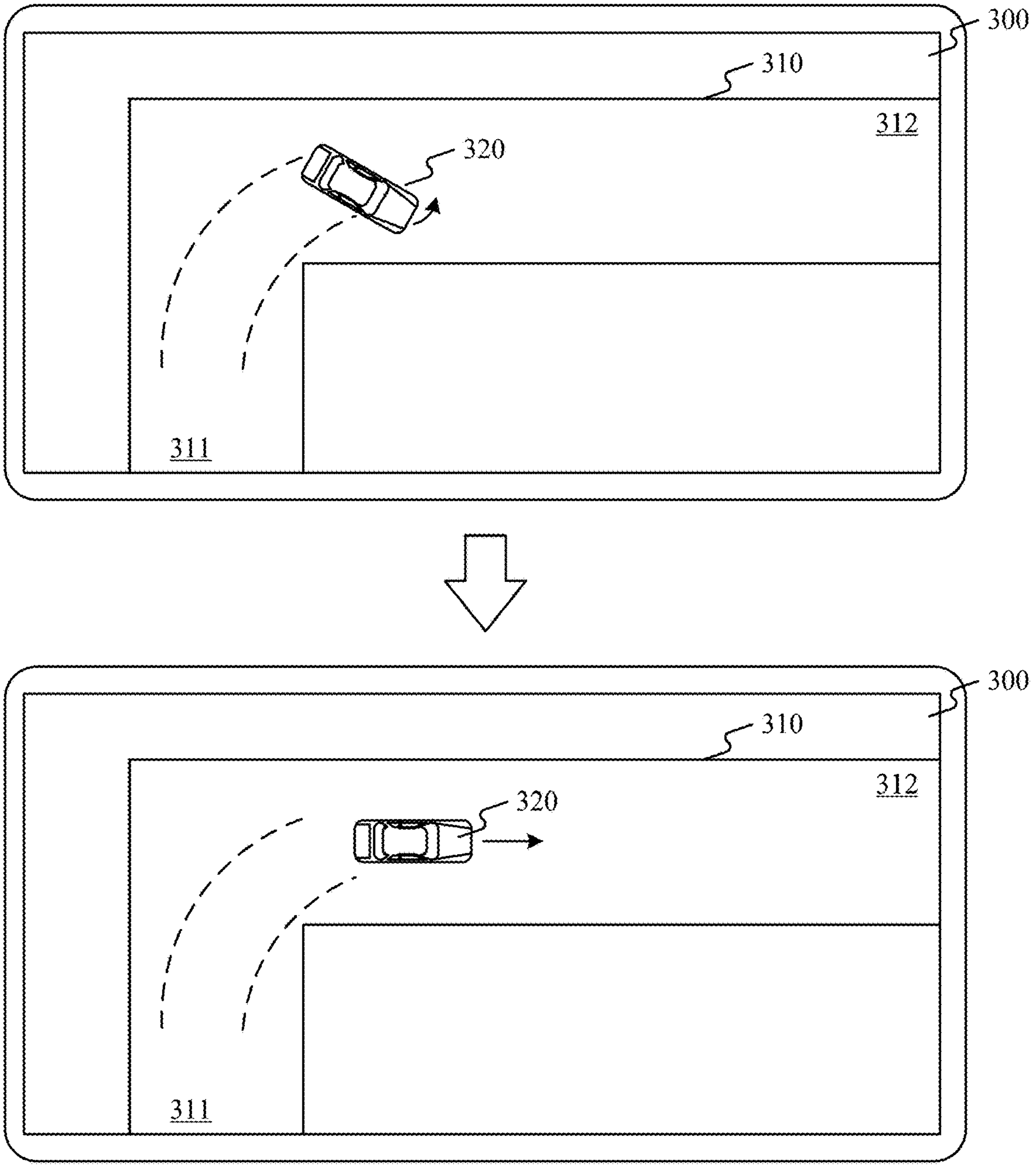
FIG. 3 is a schematic diagram of an interface of automatically turning back a vehicle head after a game assist function in a racing game is enabled according to an exemplary embodiment of this disclosure.

For example, the current game battle is a racing game battle. The game assist function is configured to perform a vehicle head back operation after a drift operation. That is, the player is assisted in rotating the vehicle head to the track direction. When the player completes the drift operation in the racing game battle, the traveling direction of the racing vehicle is usually deflected. For example, after the player controls the racing vehicle to perform a left drift operation, the vehicle head is deflected to a left side of the track. After the vehicle head is controlled by using the game assist function, a direction of the racing vehicle is consistent with the track direction, that is, the traveling direction of the racing vehicle is consistent with the track direction. For example, referring to FIG. 3, a racing game battle interface 300 includes a track 310 and a racing vehicle 320. The track 310 is presented in an L shape including a track 311 and a track 312 that are perpendicular to each other. When turning from the track 311 to the track 312, the racing vehicle 320 makes the turn through a right drift operation. After turning to the track 312, a head of the racing vehicle 320 is deflected to the right, and after being assisted by using the game assist function, the racing vehicle 320 drives in a direction parallel to the track 312.

Figure 4:
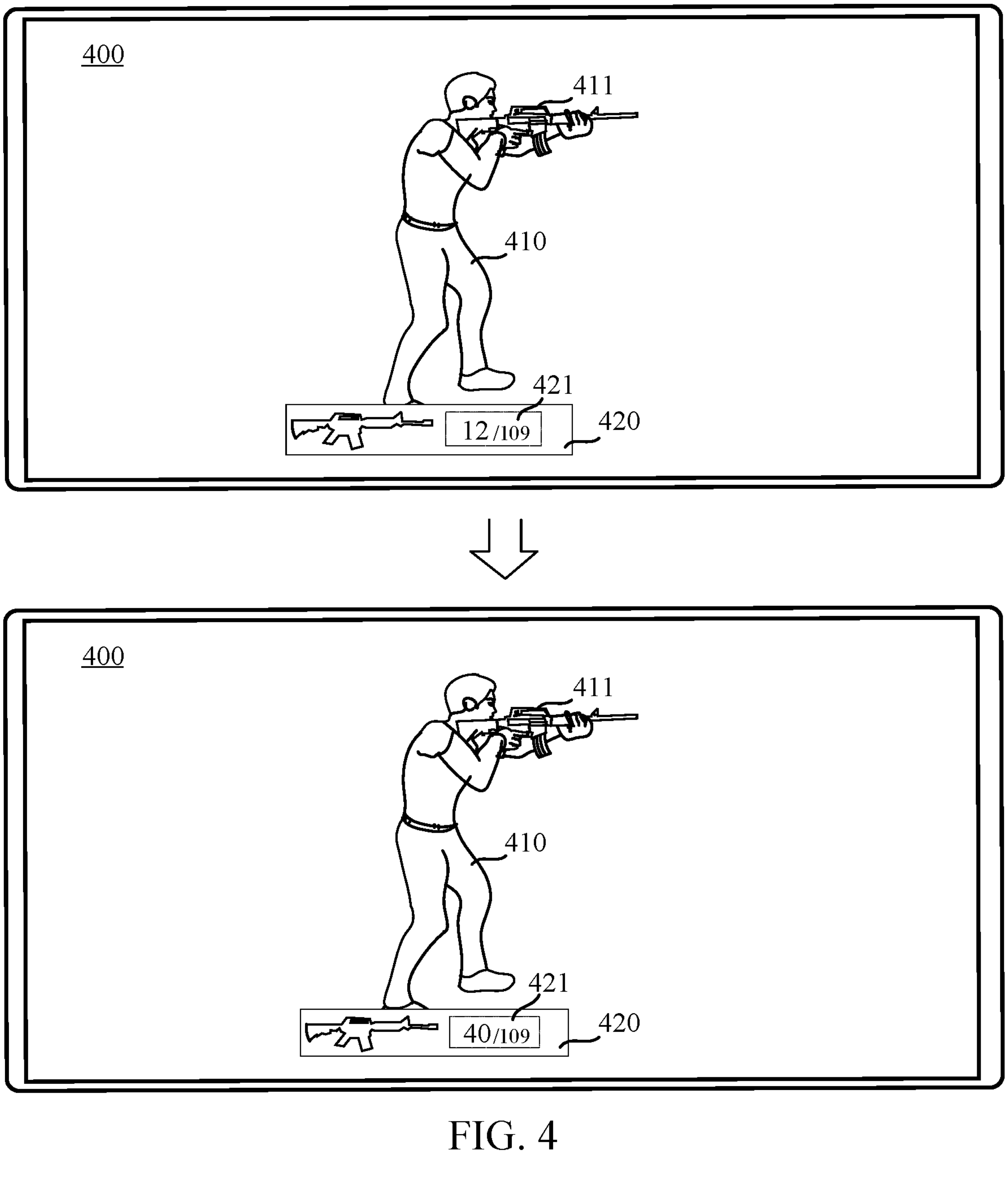
FIG. 4 is a schematic diagram of an interface of automatically loading a clip after a game assist function in a shooting game is enabled according to an exemplary embodiment of this disclosure.

For example, the current game battle is a TPS game battle. The game assist function is configured to execute a clip supplement operation after shooting. That is, the player is assisted with a clip supplement. When the player performs a shooting operation in the game battle, a quantity of bullets in a virtual gun clip is reduced. After the virtual gun clip is filled by using the game assist function, the clip is fully filled with bullets. For example, referring to FIG. 4, a TPS game battle interface 400 includes a virtual object 410 and a gun display control 420. The virtual object 410 holds a virtual gun 411, and a gun status of the virtual gun 411 is displayed in the gun display control 420, including a clip status bar 421 of the virtual gun 411. As shown in FIG. 4, a clip of the virtual gun 411 currently includes 12 bullets, while the clip includes 40 bullets in a fully loaded state. Therefore, the clip of the virtual gun 411 is fully filled by using the game assist function.

In summary, according to the assist function enabling method provided in this embodiment, the target data corresponding to the target operation is matched against the trigger condition of the assist function trigger. When the target data meets the trigger condition of the assist function trigger, the game assist function is enabled. The game assist function is configured to assist in the target operation that triggers the function to be enabled. That is, after the game assist function is enabled, an operation to be executed with the assistance of the game assist function is the target operation that triggers the function to be enabled. The target data is used for representing the execution completion status of the target operation. When the target data indicates that the execution completion status of the target operation is relatively poor, the game assist function is triggered. That is, the assist function is enabled pertinently, which is enabled for the target operation with a relatively poor execution completion status in a gaming process. Therefore, both the game assistance accuracy and the assistance efficiency can be relatively high.

Figure 5:
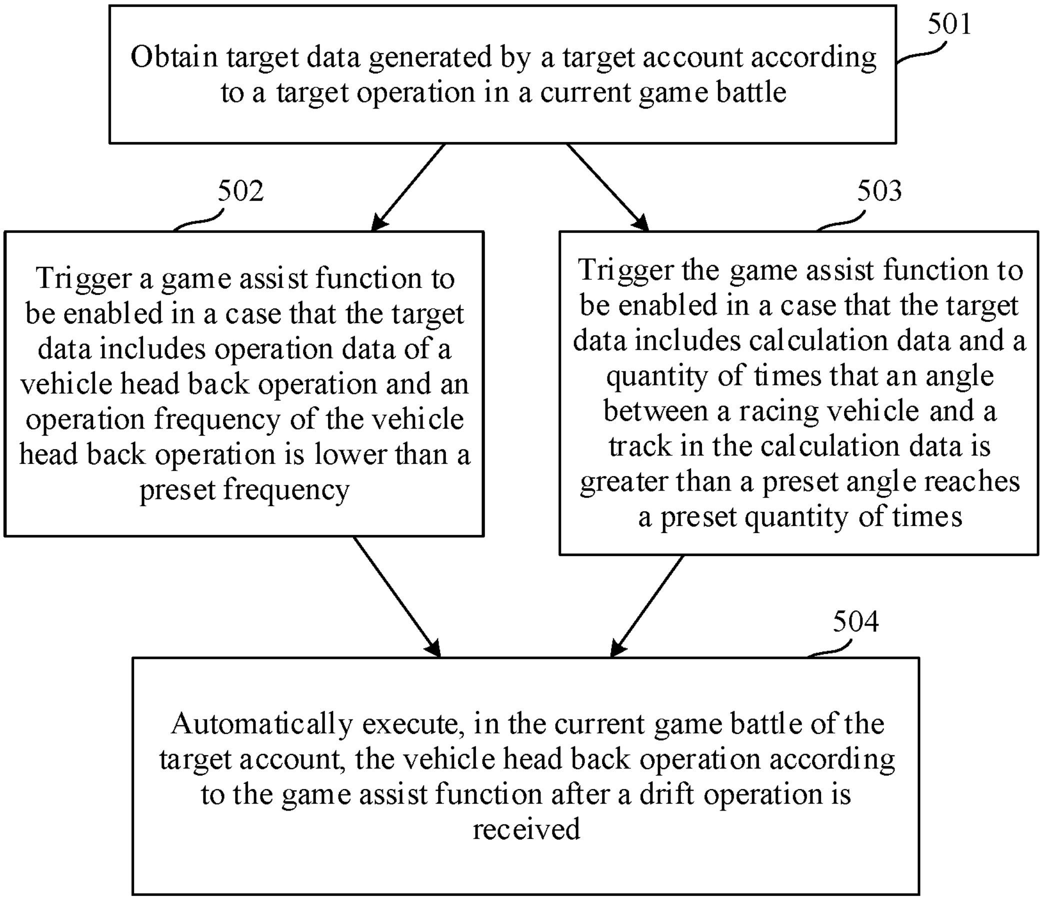
FIG. 5 is a flowchart of an assist function enabling method according to another exemplary embodiment of this disclosure.

In an optional embodiment, the foregoing game application is implemented as a racing application. FIG. 5 is a flowchart of an assist function enabling method according to another exemplary embodiment of this disclosure. The method is applicable to a racing application, and the method can include the following steps.

In step 501, target data generated by a target account according to a target operation in a current game battle is obtained.

Optionally, the target data includes data generated by the target account in the current game battle, and may further include historical data generated by the target account in a preset quantity of last battles. Optionally, the target data includes at least one of operation data and calculation data, the operation data being used for representing an operation frequency of the target operation, and the calculation data being used for representing operation completion quality of the target operation. Optionally, the target data is used for determining how proficient the target account is in the game.

In step 502, a game assist function to be enabled is triggered in a case that the target data includes operation data of a vehicle head back operation and an operation frequency of the vehicle head back operation is lower than a preset frequency.

Optionally, the operation frequency of the vehicle head back operation is calculated according to a received quantity of drift operations and a received quantity of vehicle head back operations. Optionally, the operation frequency of the vehicle head back operation is a ratio of the quantity of vehicle head back operations to the quantity of drift operations.

For example, the preset frequency is 20%. A quantity of drift operations received by a terminal is 10, and a quantity of vehicle head back operations executed after the terminal receives the drift operations is 1. As the operation frequency of the vehicle head back operation is 10%, which is lower than 20%, the game assist function is enabled.

In step 503, the game assist function to be enabled is triggered in a case that the target data includes calculation data and a quantity of times that an angle between a racing vehicle and a track in the calculation data is greater than a preset angle reaches a preset quantity of times.

Optionally, the angle between the racing vehicle and the track is obtained by determining an angle between a traveling direction of the racing vehicle and a track direction after the drift operation and the vehicle head back operation are received. Optionally, the angle between the racing vehicle and the track is obtained by determining the angle between the racing vehicle and the track after a back operation is performed after the racing vehicle drifts. The angle between the racing vehicle and the track may also be understood as an angle between the traveling direction of the racing vehicle and the track, or an angle between a line connecting the rear and the head of the racing vehicle and the track.

For example, a target data range is greater than 30°, and the preset quantity of times is three times. When a quantity of times that the angle between the racing vehicle and the track is greater than 30° reaches three times after the drift operation and the vehicle head back operation, back quality in the vehicle head back operation of the player is relatively poor, that is, the vehicle head is often excessively turned or insufficiently turned. Therefore, the game assist function is triggered to be enabled.

In step 504, the vehicle head back operation (or vehicle steer back operation), in the current game battle of the target account, is automatically executed according to the game assist function after the drift operation is received.

Optionally, in the current game battle of the target account, a force is applied to the head (or front) of the racing vehicle according to the game assist function after the drift operation is received. The force is used for deflecting the traveling direction of the racing vehicle to the track direction.

Optionally, the force may be applied to the head of the racing vehicle in any one of the following cases:

1. When no vehicle head back operation is received within a preset duration after the terminal receives the drift operation, that is, no vehicle head back operation is received within the preset duration after the racing vehicle completes a drift in the current game battle, and the angle between the racing vehicle and the track is greater than the preset angle, the force is applied to the head of the racing vehicle.
2. When the vehicle head back operation is received within the preset duration after the terminal receives the drift operation, that is, when the vehicle head back operation is received after the racing vehicle completes a drift in the current game battle, but the angle between the racing vehicle and the track is greater than the preset angle, the force is applied to the head of the racing vehicle.

Optionally, if the racing vehicle does not perform the vehicle head back operation after the drift is completed, and the angle between the racing vehicle and the track is greater than the preset angle, it indicates that the racing vehicle is not turned back after the drift, an excessive drift is caused. If the racing vehicle performs the vehicle head back operation after the drift is completed, but the angle between the racing vehicle and the track is greater than the preset angle, it indicates that the racing vehicle is deflected excessively in a back process.

Optionally, in the process of determining the angle between the racing vehicle and the track, the direction of the racing vehicle is first determined according to a line connecting the center and the head of the racing vehicle, and the angle is determined according to an angle between the direction of the racing vehicle and the track direction.

Optionally, in the process of applying the force to the head of the racing vehicle, a magnitude of the force is calculated by determining a friction between the racing vehicle and ground, and the force is applied to the vehicle head, to ensure that the traveling direction of the racing vehicle is consistent with the track direction.

Figure 6:
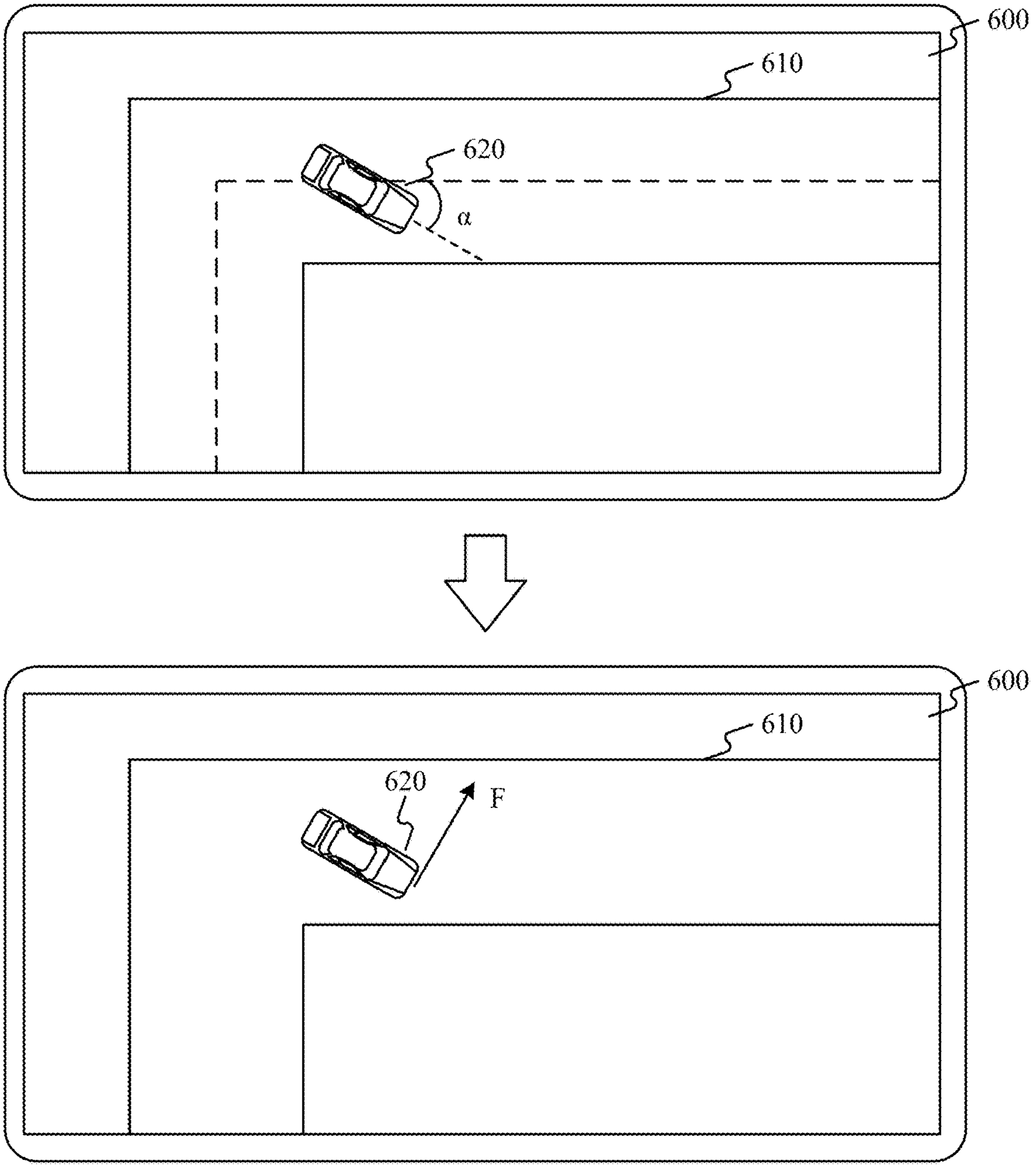
FIG. 6 is a schematic diagram of an interface of calculating a force F according to an angle between a racing vehicle and a track according to an exemplary embodiment of this disclosure.

For example, referring to FIG. 6, a racing game battle interface 600 includes a track 610 and a racing vehicle 620. After the racing vehicle 620 makes a turn through a right drift operation, a head of the racing vehicle 620 is deflected to the right, and an angle between the racing vehicle 620 and the track is α. After a friction between the racing vehicle 620 and the track 610 is determined by using the game assist function, a force F is calculated, and the force F is applied to the head of the racing vehicle 620.

Figure 7:
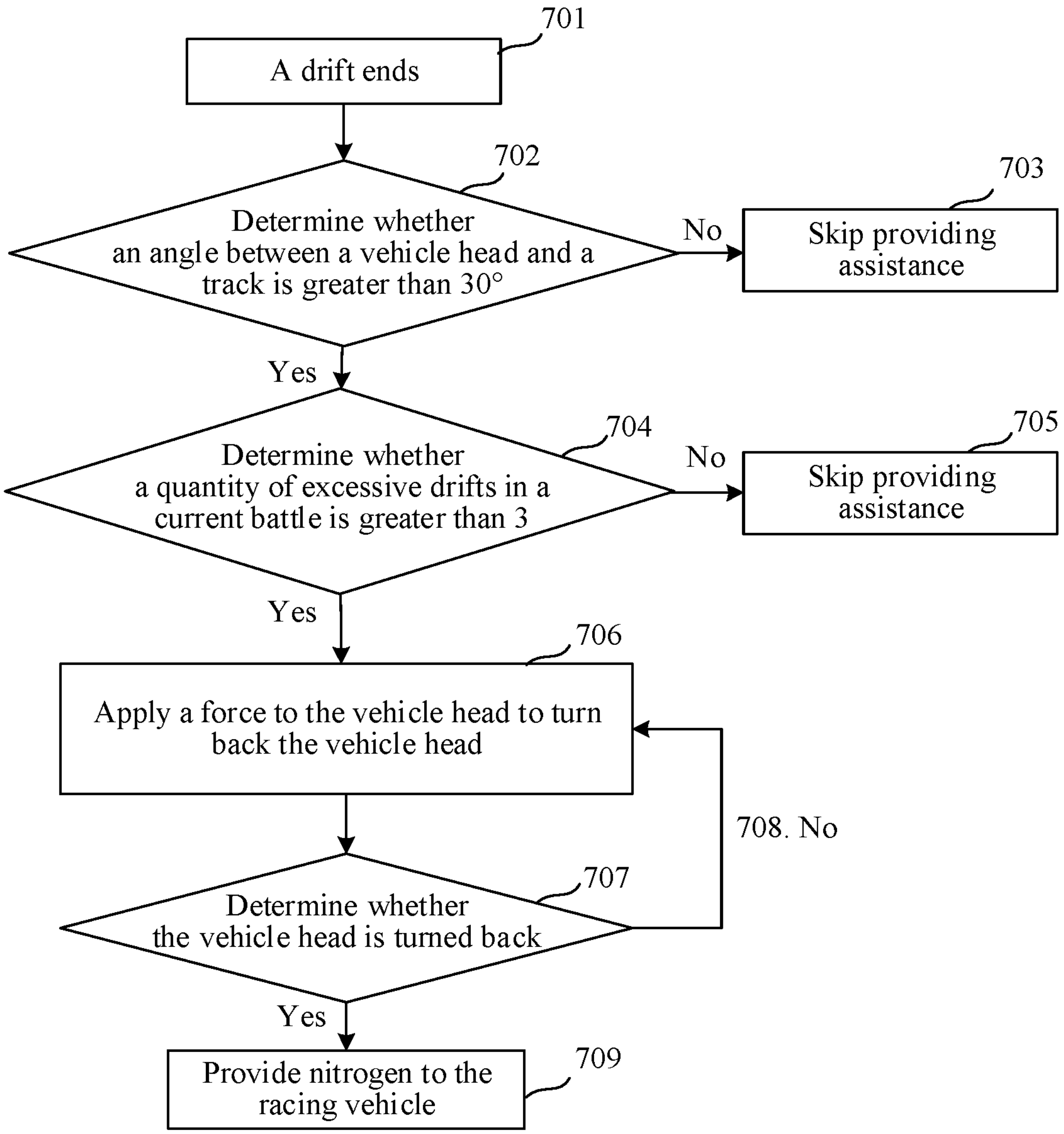
FIG. 7 is a flowchart of an assist function enabling method according to another exemplary embodiment of this disclosure.

For example, the process is described with reference to FIG. 7. Referring to FIG. 7, in step 701, a drift ends. In step 702, a determination is made as to whether an angle between a vehicle head and a track is greater than an angle such as 30°. In step 703, providing assistance is skipped when the angle between the vehicle head and the track is not greater than 30°. In step 704, a determination is made as to whether a quantity of excessive drifts in a current battle is greater than a number such as 3 when the angle between the vehicle head and the track is greater than 30°. In step 705, providing assistance is skipped when the quantity of excessive drifts in the current game is not greater than 3. In step 706, a force is applied to the vehicle head to turn back the vehicle head when the quantity of excessive drifts in the current game is greater than 3. In step 707, a determination is made as to whether the vehicle head is turned back. In step 708, performing of step 706 is continued when the vehicle head is not turned back. In step 709, nitrogen is provided to the racing vehicle when the vehicle head is turned back.

Optionally, step 709 may be implemented automatically according to a game assist function, or may be implemented according to an operation of a player in a game interface.

Optionally, after the game assist function is enabled, when the vehicle head back operation is performed within a preset duration after the racing vehicle completes a drift in the current game battle, and the angle between the racing vehicle and the track is not greater than the preset angle, there is no need to apply the force to the head of the racing vehicle.

Optionally, in the process of applying the force to the head of the racing vehicle, when the player performs an operation in the game battle, to avoid mutual interference between the operation performed by the player and the force applied to the head of the racing vehicle, the operation of the player is omitted.

In summary, according to the assist function enabling method provided in this embodiment, the target data corresponding to the target operation is matched against the trigger condition of the assist function trigger. When the target data meets the trigger condition of the assist function trigger, the game assist function is enabled. The game assist function is configured to assist in the target operation that triggers the function to be enabled. That is, after the game assist function is enabled, an operation to be executed with the assistance of the game assist function is the target operation that triggers the function to be enabled. The target data is used for representing the execution completion status of the target operation. When the target data indicates that the execution completion status of the target operation is relatively poor, the game assist function is triggered. That is, the assist function is enabled pertinently, which is enabled for the target operation with a relatively poor execution completion status in a gaming process. Therefore, both the game assistance accuracy and the assistance efficiency are relatively high.

According to the method provided in this embodiment, in the racing application, how proficient the player is in the game is determined by determining whether the player performs the vehicle head back operation after the drift, or determining the back accuracy when the player performs the vehicle head back operation. When the player is not proficient in the game, the assist function is enabled to assist the player in completing the vehicle head back operation after the drift, which is convenient for the player to operate and to improve the proficiency of a novice player in the game.

Figure 8:
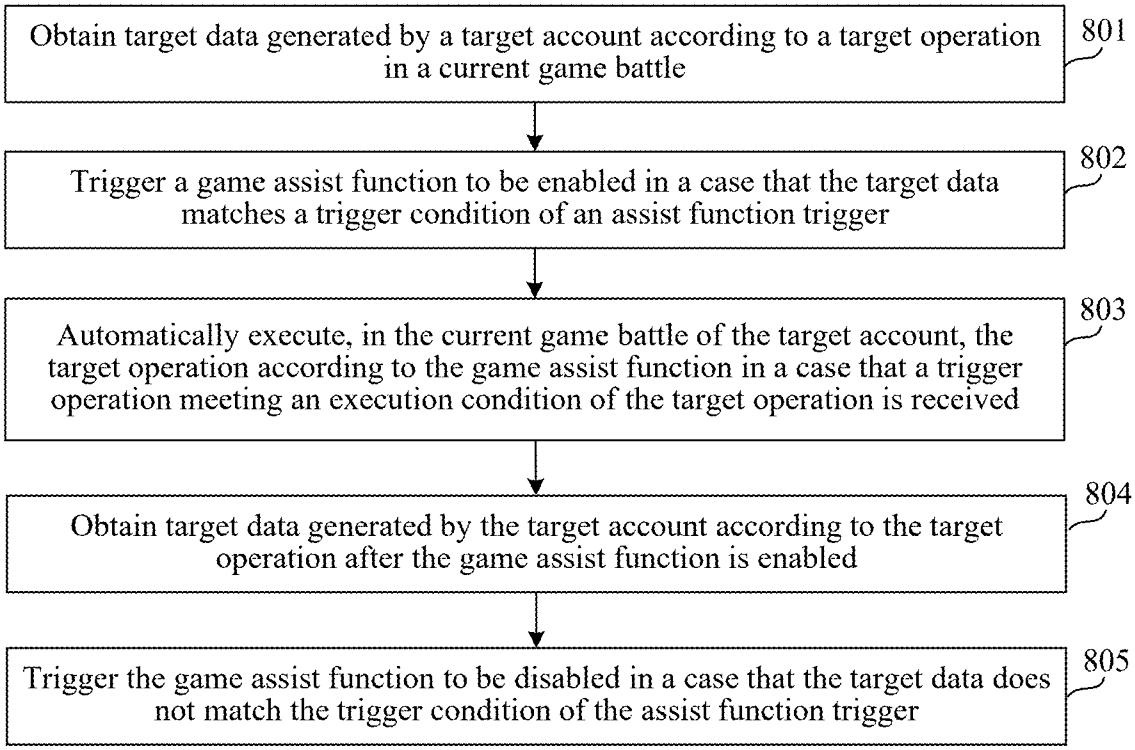
FIG. 8 is a flowchart of an assist function enabling method according to another exemplary embodiment of this disclosure.

In an optional embodiment, after being automatically enabled, the game assist function may also be automatically disabled according to target data. FIG. 8 is a flowchart of an assist function enabling method according to another exemplary embodiment of this disclosure. The method is applicable to a game application, and the method can include the following steps.

In step 801, target data generated by a target account according to a target operation in a current game battle is obtained.

Optionally, the target data includes data generated by the target account in the current game battle, and may further include historical data generated by the target account in a preset quantity of last battles. Optionally, the target data includes at least one of operation data and calculation data, the operation data being used for representing an operation frequency of the target operation, and the calculation data being used for representing operation completion quality of the target operation. Optionally, the target data is used for determining how proficient the target account is in the game.

In step 802, a game assist function to be enabled is triggered in a case that the target data matches a trigger condition of an assist function trigger.

Optionally, the target data is used for representing an execution completion status of the target operation, and the game assist function is configured to assist in executing the target operation. Optionally, the trigger condition of the assist function trigger is a corresponding condition when the execution completion status of the target operation is lower than a preset completion status.

Optionally, the trigger condition is set in the assist function trigger, the trigger condition being used for matching against the target data, to determine whether the target data meets a requirement for triggering the game assist function.

Optionally, the target data includes at least one of operation data and calculation data, the operation data including an operation frequency of the target operation, and the calculation data including operation completion quality of the target operation. A status of matching between the target data and the trigger condition of the assist function trigger may be determined in any one of the foregoing cases.

Optionally, the game assist function is a function of assisting a player with an assist operation through a client to finish a game. Optionally, the game assist function is configured to assist in executing the target operation.

Figure 9:
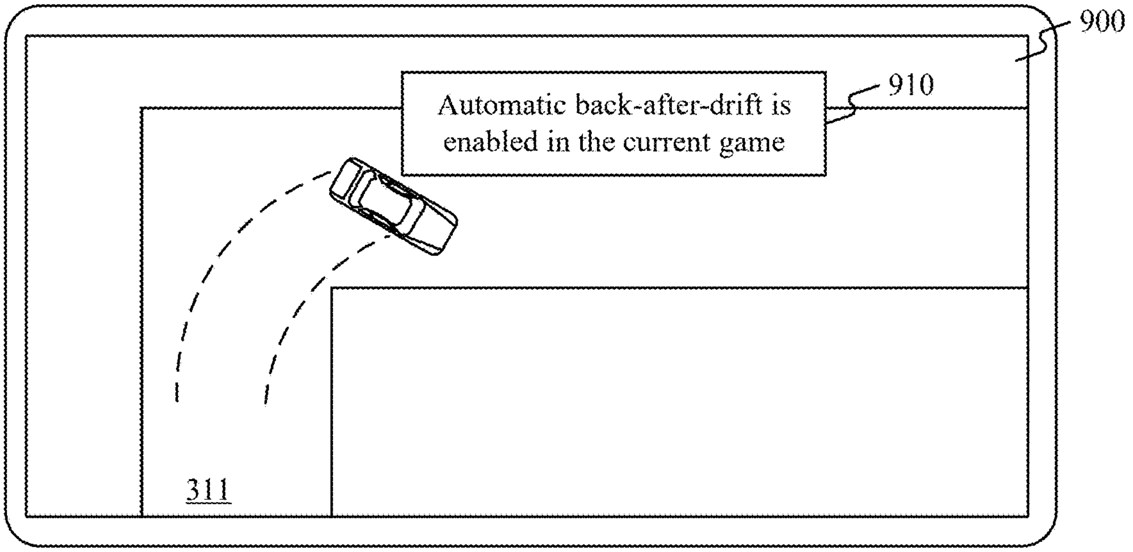
FIG. 9 is a schematic diagram of an interface of prompting after a game assist function is enabled according to an exemplary embodiment of this disclosure.

Optionally, after the game assist function is enabled, a prompt message is displayed in an interface of the game battle. The prompt message is used for prompting the player that the game assist function is enabled in the current game battle. For example, referring to FIG. 9, a prompt message 910 is displayed in a racing game battle interface 900.

Prompt content of the prompt message 910 is "Automatic back-after-drift is enabled in the current game".

In step 803, the target operation, in the current game battle of the target account, is automatically executed according to the game assist function in a case that a trigger operation meeting an execution condition of the target operation is received.

Optionally, after the game assist function is enabled, the client performs an assist operation according to a player operation of the player in the game battle. Optionally, the trigger operation is an operation that triggers the target operation, that is, an operation executed before the target operation is executed in the game battle.

Optionally, the game assist function is a function applicable to the current game battle. The game assist function is also applicable to another game battle of the target account. For example, the game assist function is applicable to a game battle that is started after the current game battle.

In step 804, obtain target data generated by the target account according to the target operation after the game assist function is enabled.

Optionally, the target data is data generated by the target account according to the target operation in a process of continuing the game after the game assist function is automatically enabled.

In step 805, the game assist function is triggered to be disabled in a case that the target data does not match the trigger condition of the assist function trigger.

Optionally, the target data includes the data generated by the target account according to the target operation after the game assist function is enabled. Optionally, the target data may further include data generated according to the target operation before the game assist function is enabled.

Optionally, an operation realized by the assist function is different from a player operation. Usually, the operation realized by the assist function has a weaker effect than the player operation. For example, in a racing game battle, after triggering a drift operation, the player can perform a vehicle head back operation at the same time as the drift operation is ended, while the assist function needs to realize the vehicle head back operation after a preset duration after the player triggers the drift operation. Therefore, the player prefers to play the game through the player operation.

Figure 10:
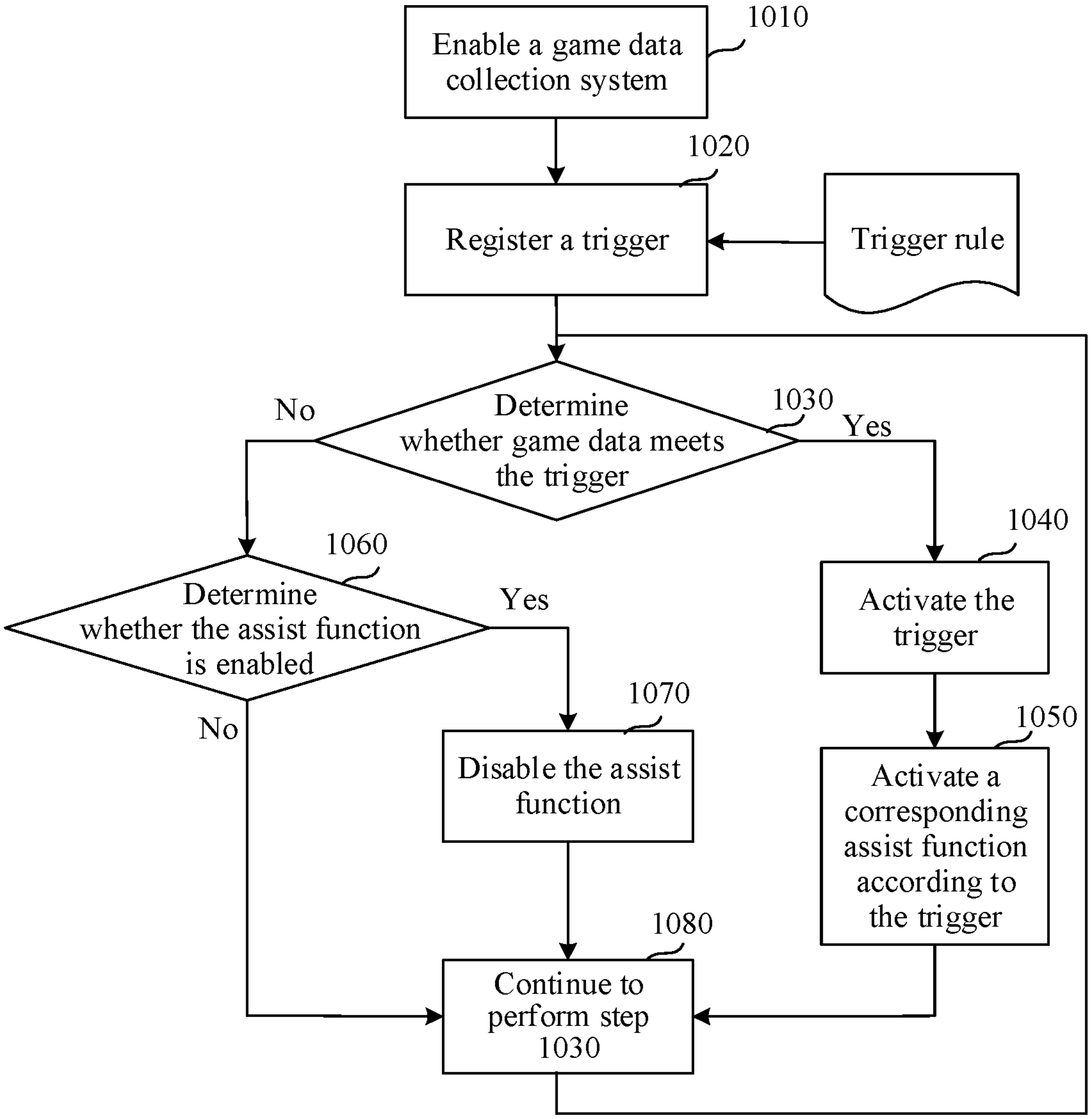
FIG. 10 is a flowchart of an assist function enabling method according to another exemplary embodiment of this disclosure.

For example, referring FIG. 10, an enabling process of the assist function is shown in FIG. 10. In step 1010, a game data collection system is enabled. In step 1020, a trigger is registered by using a trigger rule. In step 1030, a determination is made as to whether game data meets the trigger. In step 1040, the trigger is activated when the game data meets the trigger. In step 1050, a corresponding assist function is activated according to the trigger. In step 1060, a determination is made as to whether the assist function is enabled when the game data does not meet the trigger. In step 1070, the assist function is disabled when the assist function is enabled. In step 1080, performing of step 1030 is continued to determine whether game data meets the trigger when the assist function is not enabled.

In summary, according to the assist function enabling method provided in this embodiment, the target data corresponding to the target operation is matched against the trigger condition of the assist function trigger. When the target data meets the trigger condition of the assist function trigger, the game assist function is enabled. The game assist function is configured to assist in the target operation that triggers the function to be enabled. That is, after the game assist function is enabled, an operation to be executed with the assistance of the game assist function is the target operation that triggers the function to be enabled. The target data is used for representing the execution completion status of the target operation. When the target data indicates that the execution completion status of the target operation is relatively poor, the game assist function is triggered. That is, the assist function is enabled pertinently, which is enabled for the target operation with a relatively poor execution completion status in a gaming process. Therefore, both the game assistance accuracy and the assistance efficiency can be relatively high.

According to the method provided in this embodiment, after the game assist function is enabled, target data is still matched against the trigger. When the target data does not match the trigger condition of the trigger, the game assist function is disabled to prevent the game assist function from affecting the player operation after the player is proficient in the game and the game operation.

Figure 11:
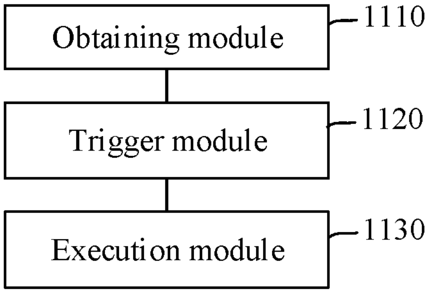
FIG. 11 is a structural block diagram of an assist function enabling apparatus according to an exemplary embodiment of this disclosure.

FIG. 11 is a structural block diagram of an assist function enabling apparatus according to an exemplary embodiment of this disclosure. The apparatus may be implemented in a terminal. As shown in FIG. 11, the apparatus includes: an obtaining module 1110, a trigger module 1120, and an execution module 1130. One or more of the modules can be implemented by processing circuitry, software, or a combination thereof, for example.

The obtaining module 1110 is configured to obtain target data generated by a target account according to a target operation in a current game battle.

The trigger module 1120 is configured to trigger a game assist function to be enabled in response to the target data matching a trigger condition of an assist function trigger, the target data being used for representing an execution completion status of the target operation, and the game assist function being configured to assist in executing the target operation.

The execution module 1130 is configured to automatically execute, in the current game battle of the target account, the target operation according to the game assist function in a case that a trigger operation meeting an execution condition of the target operation is received.

In an optional embodiment, the trigger condition of the assist function trigger includes the execution completion status of the target operation being lower than a preset completion status.

In an optional embodiment, the target data includes at least one of operation data and calculation data, the operation data including an operation frequency of the target operation, and the calculation data including operation completion quality of the target operation.

The trigger module 1120 can be further configured to trigger the game assist function to be enabled in response to the target data including the operation data and the operation frequency of the target operation represented by the operation data being lower than a preset frequency. The trigger module 1120 can be further configured to trigger the game assist function to be enabled in response to the target data including the calculation data and a quantity of times of occurrence of data within a target data range in the calculation data reaching a preset quantity of times. The trigger module can be further configured to trigger the game assist function to be enabled in response to the target data including the operation data and the calculation data, the operation frequency represented by the operation data being lower than the preset frequency, and the quantity of times of occurrence of the data within the target data range in the calculation data reaching the preset quantity of times.

In an optional embodiment, the apparatus is applicable to a racing application, the target account is an account logged in to the racing application, and the target operation is a vehicle head back operation.

The trigger module 1120 is further configured to trigger the game assist function to be enabled in response to the target data including operation data of the vehicle head back operation and an operation frequency of the vehicle head back operation being lower than the preset frequency, the operation frequency of the vehicle head back operation being calculated according to a received quantity of drift operations and a received quantity of vehicle head back operations.

In an optional embodiment, the apparatus is applicable to a racing application, the target account is an account logged in to the racing application, the target operation is a vehicle head back operation, and the calculation data is used for representing an angle between a racing vehicle and a track after the vehicle head back operation is received.

The trigger module 1120 is further configured to trigger the game assist function to be enabled in response to the target data including the calculation data and a quantity of times that the angle between the racing vehicle and the track in the calculation data is greater than a preset angle reaching the preset quantity of times, the angle between the racing vehicle and the track being obtained by determining an angle between a traveling direction of the racing vehicle and a track direction after a drift operation and the vehicle head back operation are received.

In an optional embodiment, the execution module 1130 is further configured to automatically execute the vehicle head back operation according to the game assist function in response to the drift operation being received.

In an optional embodiment, the execution module 1130 is further configured to apply a force to a head of the racing vehicle according to the game assist function in response to the drift operation being received, the force being used for deflecting the traveling direction of the racing vehicle to the track direction.

In an optional embodiment, the execution module 1130 can be further configured to apply the force to the head of the racing vehicle in response to no vehicle head back operation being received within a preset duration after the drift operation is received and the angle between the racing vehicle and the track being greater than the preset angle. The execution module 1130 can be further configured to apply the force to the head of the racing vehicle in response to the vehicle head back operation being received within the preset duration after the drift operation is received but the angle between the racing vehicle and the track being greater than the preset angle.

In summary, according to the assist function enabling apparatus provided in this embodiment, the target data corresponding to the target operation is matched against the trigger condition of the assist function trigger. When the target data meets the trigger condition of the assist function trigger, the game assist function is enabled. The game assist function is configured to assist in the target operation that triggers the function to be enabled. That is, after the game assist function is enabled, an operation to be executed with the assistance of the game assist function is the target operation that triggers the function to be enabled. The target data is used for representing the execution completion status of the target operation. When the target data indicates that the execution completion status of the target operation is relatively poor, the game assist function is triggered. That is, the assist function is enabled pertinently, which is enabled for the target operation with a relatively poor execution completion status in a gaming process. Therefore, both the game assistance accuracy and the assistance efficiency can be relatively high.

For the assist function enabling apparatus provided in the foregoing embodiments, division of the foregoing functional modules is merely used as an example for description. In actual applications, the foregoing functions may be allocated to be accomplished by different functional modules as required. That is, the internal structure of the device is divided into different functional modules to accomplish all or some of the functions described above. In addition, the assist function enabling apparatus provided in the foregoing embodiment can share the same concept with the method embodiment of the assist function enabling method. For the specific implementation process of the apparatus, refer to the method embodiment, and details are not described herein again.

Figure 12:
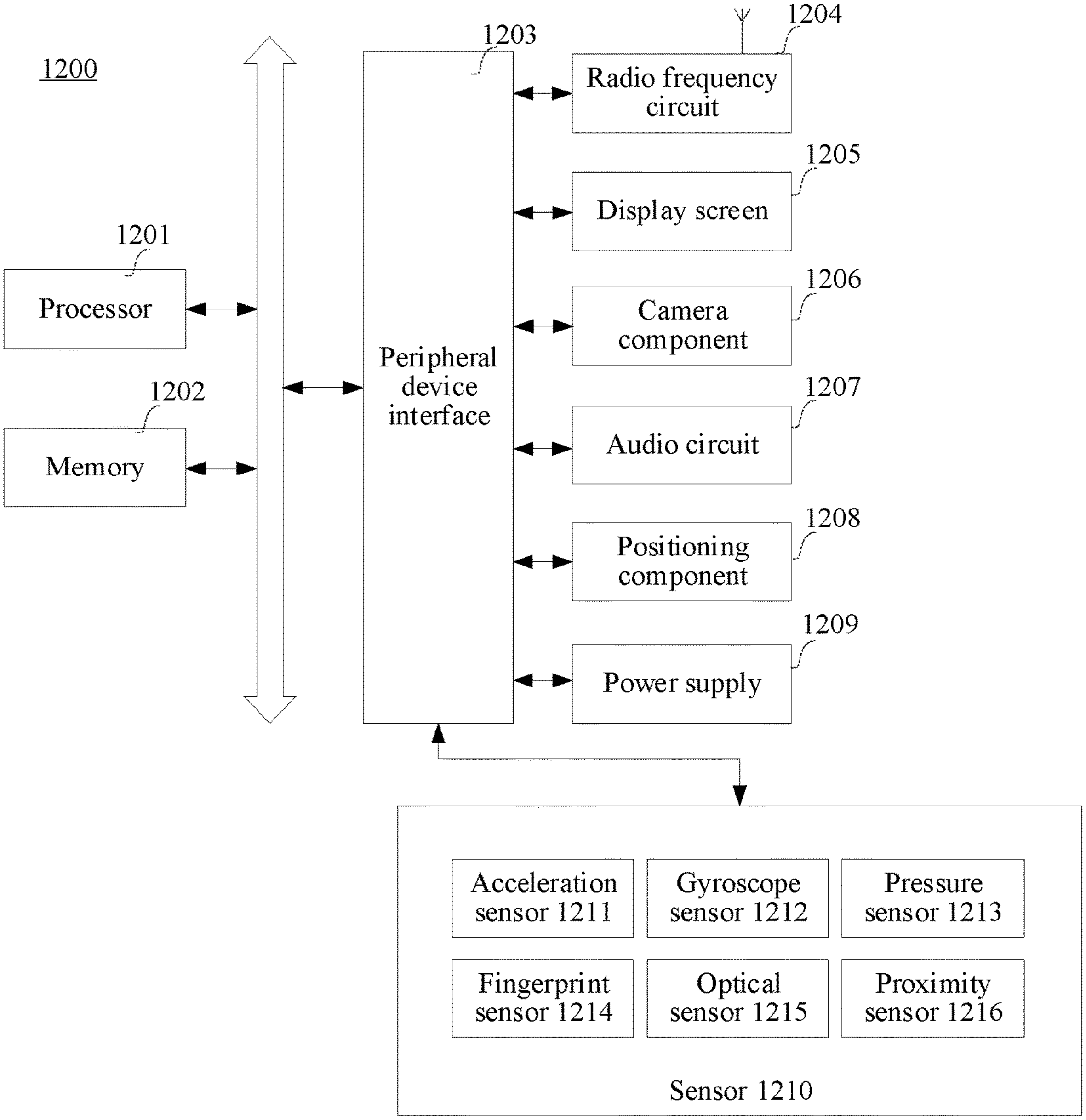
FIG. 12 is a structural block diagram of a terminal according to an exemplary embodiment of this disclosure.

FIG. 12 is a structural block diagram of a terminal 1200 according to an exemplary embodiment of this disclosure. The terminal 1200 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be other devices such as user equipment, a portable terminal, a laptop terminal, or a desktop terminal.

Generally, the terminal 1200 includes a processor 1201 and a memory 1202.

The processor 1201 (e.g., processing circuitry) may include one or more processing cores, for example, a 4-core processor or an 8-core processor. The processor 1201 may be implemented by using at least one hardware form of digital signal processor (DSP), a field-programmable gate array (FPGA), and a programmable logic array (PLA). The processor 1201 may also include a main processor and a coprocessor. The main processor is a processor configured to process data in a wake-up state, and is also referred to as a central processing unit (CPU). The coprocessor is a low-power processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process a computer operation related to machine learning.

The memory 1202 may include one or more computer-readable storage media. The computer-readable storage medium may be non-transient (or non-transitory). The memory 1202 may further include a high-speed random access memory and a non-volatile memory, such as one or more magnetic disk storage devices or flash memory devices. In some embodiments, the non-transitory computer-readable storage medium in the memory 1202 is configured to store at least one instruction, the at least one instruction being configured to be executed by the processor 1201 to implement the assist function enabling method provided in the method embodiments of this disclosure.

In some embodiments, the terminal 1200 may further optionally include a peripheral device interface 1203 and at least one peripheral device. The processor 1201 and the memory 1202 may be connected to the peripheral device interface 1203 by using a bus or a signal cable. The peripheral device may be connected to the peripheral device interface 1203 by using a bus, a signal cable, or a circuit board. Specifically, the peripheral device includes at least one of a radio frequency (RF) circuit 1204, a display screen 1205, a camera component 1206, an audio circuit 1207, a positioning component 1208, and a power supply 1209.

The peripheral device interface 1203 may be configured to connect the at least one peripheral device related to input/output (I/O) to the processor 1201 and the memory 1202. In some embodiments, the processor 1201, the memory 1202, and the peripheral device interface 1203 are integrated on the same chip or circuit board. In some other embodiments, any one or two of the processors 1201, the memory 1202, and the peripheral device interface 1203 may be implemented on an independent chip or circuit board. This is not limited in this embodiment.

The RF circuit 1204 is configured to receive and transmit an RF signal, which is also referred to as an electromagnetic signal. The RF circuit 1204 communicates with a communication network or with another communication device by using an electromagnetic signal. The RF circuit 1204 converts an electrical signal into an electromagnetic signal for transmission, or converts a received electromagnetic signal into an electrical signal. Optionally, the RF circuit 1204 includes: an antenna system, an RF transceiver, one or more amplifiers, a tuner, an oscillator, a DSP, a codec chip set, a subscriber identity module card, and the like. The RF circuit 1204 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or Wi-Fi network. In some embodiments, the RF 1204 may further include a circuit related to near field communication (NFC). This is not limited in this disclosure.

The display screen 1205 is configured to display a user interface (UI). The UI may include a graph, a text, an icon, a video or any combination thereof. In a case that the display screen 1205 is a touch display screen, the display screen 1205 further has a capability of collecting a touch signal on or above a surface of the display screen 1205. The touch signal may be used as a control signal to be inputted to the processor 1201 for processing. In this case, the display screen 1205 may further be configured to provide a virtual button and/or a virtual keyboard, also referred to as a soft button and/or a soft keyboard. In some embodiments, there may be one display screen 1205, disposed on a front panel of the terminal 1200. In some other embodiments, there may be at least two display screens 1205, respectively disposed on different surfaces of the terminal 1200 or designed in a foldable shape. In still some other embodiments, the display screen 1205 may be a flexible display screen, disposed on a curved surface or a folded surface of the terminal 1200. Even, the display screen 1205 may be further set in a non-rectangular irregular pattern, that is, a special-shaped screen. The display panel 1205 may be prepared by using materials such as a liquid crystal display (LCD) and an organic light-emitting diode (OLED).

The camera component 1206 is configured to capture images or videos. Optionally, the camera component 1206 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to implement a background blur blurring function through fusion of the main camera and the depth-of-field camera, panoramic photo shooting and virtual reality (VR) shooting functions through fusion of the main camera and the wide-angle camera, or another fusion shooting function. In some embodiments, the camera component 1206 may further include a flashlight. The flashlight may be a single-color temperature flashlight or a double-color temperature flashlight. The double-color temperature flashlight is a combination of a warm flashlight and a cold flashlight, which may be used for light compensation at different color temperatures.

The audio circuit 1207 may include a microphone and a speaker. The microphone is configured to collect sound waves from a user and in an environment, and convert the sound waves into electrical signals and input the electrical signals into the processor 1201 for processing, or input the electrical signals into the RF circuit 1204 to implement speech communication. For a purpose of stereo collection or noise reduction, there may be a plurality of microphones, disposed at different parts of the terminal 1200 respectively. The microphone may further be an array microphone or an omnidirectional collection microphone. The speaker is configured to convert an electrical signal from the processor 1201 or the RF circuit 1204 into a sound wave. The speaker may be a conventional thin film speaker, or may be a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 1207 may further include an earphone jack.

The positioning component 1208 is configured to locate a current geographical position of the terminal 1200, to implement navigation or a location based service (LBS). The positioning component 1208 may be a positioning component based on the global positioning system (GPS) of the United States, the BeiDou system of China, or the Galileo system of Russia.

The power supply 1209 is configured to supply power to the components in the terminal 1200. The power supply 1209 may be an alternating current, a direct current, a disposable battery, or a rechargeable battery. When the power supply 1209 includes a rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a fast charging technology.

In some embodiments, the terminal 1200 further includes one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established by the terminal 1200. For example, the acceleration sensor 1211 may be configured to detect components of gravity acceleration on the three coordinate axes. The processor 1201 may control, according to a gravity acceleration signal collected by the acceleration sensor 1211, the touch display screen 1205 to display the UI in a frame view or a portrait view. The acceleration sensor 1211 may further be configured to collect motion data of a game or the user.

The gyroscope sensor 1212 may detect a body direction and a rotation angle of the terminal 1200. The gyroscope sensor 1212 may collect a 3D action of the user on the terminal 1200 together with the acceleration sensor 1211. The processor 1201 may implement the following functions according to data collected by the gyroscope sensor 1212: motion sensing (e.g., the UI is changed according to a tilt operation of the user), image stabilization during shooting, game control, and inertial navigation.

The pressure sensor 1213 may be disposed on a side frame of the terminal 1200 and/or on a lower layer of the touch display screen 1205. When the pressure sensor 1213 is disposed on the side frame of the terminal 1200, a holding signal of the user on the terminal 1200 may be detected. The processor 1201 performs left and right hand recognition or a shortcut operation according to the holding signal collected by the pressure sensor 1213. When the pressure sensor 1213 is disposed on the lower layer of the touch display screen 1205, the processor 1201 controls an operable control on the UI according to a pressure operation of the user on the touch display screen 1205. The operable control includes at least one of a button control, a scroll-bar control, an icon control, and a menu control.

The fingerprint sensor 1214 is configured to collect fingerprints of the user. The processor 1201 recognizes an identity of the user according to the fingerprints collected by the fingerprint sensor 1214, or, the fingerprint sensor 1214 recognizes an identity of the user according to the collected fingerprints. When the identity of the user is recognized as a trusted identity, the processor 1201 authorizes the user to perform a related sensitive operation. The sensitive operation includes unlocking a screen, viewing encrypted information, downloading software, paying, changing a setting, and the like. The fingerprint sensor 1214 may be disposed on a front surface, a back surface, or a side surface of the terminal 1200. When the terminal 1200 is provided with a physical button or a manufacturer logo, the fingerprint sensor 1214 may be integrated with the physical button or the manufacturer logo.

The optical sensor 1215 is configured to collect ambient light intensity. In an embodiment, the processor 1201 may control display luminance of the touch display screen 1205 according to the ambient light intensity collected by the optical sensor 1215. Specifically, in a case that the ambient light intensity is relatively high, the display luminance of the touch display screen 1205 is increased. In a case that the ambient light intensity is relatively low, the display luminance of the touch display screen 1205 is reduced. In another embodiment, the processor 1201 may further dynamically adjust shooting parameters of the camera component 1206 according to the ambient light intensity collected by the optical sensor 1215.

The proximity sensor 1216 is also referred to as a distance sensor, and is generally disposed on the front panel of the terminal 1200. The proximity sensor 1216 is configured to collect a distance between the user and the front face of the terminal 1200. In an embodiment, in a case that the proximity sensor 1216 detects that the distance between the user and the front face of the terminal 1200 gradually decreases, the processor 1201 controls the touch display screen 1205 to switch from a screen-on state to a screen-off state. In a case that the proximity sensor 1216 detects that the distance between the user and the front face of the terminal 1200 gradually increases, the processor 1201 controls the touch display screen 1205 to switch from the screen-off state to the screen-on state.

A person skilled in the art may understand that the structure shown in FIG. 12 constitutes no limitation on the terminal 1200, and the terminal may include more or fewer components than those shown in the figure, or some components may be combined, or a different component deployment may be used.

A person of ordinary skill in the art may understand that all or some of the steps of the methods in the foregoing embodiments may be implemented by a program instructing relevant hardware. The program may be stored in a computer-readable storage medium, such as a non-transitory computer-readable storage medium. The computer-readable storage medium may be the computer-readable storage medium included in the memory in the foregoing embodiment, or may be a computer-readable storage medium that exists independently and that is not installed in a terminal. The computer-readable storage medium stores at least one instruction, at least one program, a code set or an instruction set, the at least one instruction, the at least one program, the code set or the instruction set being loaded and executed by the processor to implement the assist function enabling method according to any one of FIG. 2, FIG. 5, and FIG. 8.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this disclosure are merely for description purpose but do not imply the preference among the embodiments.

A person of ordinary skill in the art may understand that all or some of the steps of the foregoing embodiments may be implemented by processing circuitry such as hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this disclosure, but are not intended to limit the scope of this disclosure. Any modification, equivalent replacement, or improvement made without departing from the spirit and principle of this disclosure shall fall within the protection scope of this disclosure.

What is claimed is:

1. A method of enabling an assist function, the method comprising:

turning on the assist function based on an execution history of a second operation, which that is to be performed by a virtual object in a virtual environment after a first operation is performed by the virtual object, meeting a trigger condition, the turned-on assist function being configured to automatically control the virtual object to perform the second operation after the first operation;

receiving a first user input to perform the first operation by the virtual object; and automatically performing, via the assist function, the second operation by the virtual object after the first operation is performed by the virtual object and based on the assist function being turned on.

2. The method according to claim 1, wherein the assist function is a game assist function.

3. The method according to claim 1, wherein the execution history indicates a number of times the second operation is not performed after the first operation is performed by the virtual object, and the turning on the assist function includes turning on the assist function based on the number of times the second operation is not performed.

4. The method according to claim 1, wherein the automatically performing comprises:

automatically performing, via the assist function, the second operation by the virtual object after the first operation and based on the assist function being turned on and state information of the virtual object.

5. The method according to claim 4, wherein the first operation causes the virtual object to enter a drifting state, and the second operation causes the virtual object to exit the drifting state.

6. The method according to claim 5, wherein the state information indicates an angle of the virtual object relative to a track in the virtual environment, and the automatically performing includes automatically performing, via the assist function, the second operation by the virtual object after the first operation and based on the assist function being turned on and the angle of the virtual object relative to the track being greater than a preset angle.

7. The method according to claim 4, wherein the first operation is a shooting operation, and the second operation is a reloading operation.

8. The method according to claim 7, wherein the state information indicates a remaining amount of projectiles for the shooting operation, and the automatically performing includes automatically performing, via the assist function, the reloading operation by the virtual object after the first operation causes the remaining amount of projectiles to reach a preset threshold and based on the assist function being turned on.

9. An information processing apparatus, comprising:

processing circuitry configured to:

turn on an assist function based on an execution history of a second operation, which is to be performed by a virtual object in a virtual environment after a first operation is performed by the virtual object, meeting a trigger condition, the turned-on assist function being configured to automatically control the virtual object to perform the second operation after the first operation;

receive a first user input to perform the first operation by the virtual object; and automatically perform, via the assist function, the second operation by the virtual object after the first operation is performed by the virtual object and based on the assist function being turned on.

10. The information processing apparatus according to claim 9, wherein the assist function is a game assist function.

11. The information processing apparatus according to claim 9, wherein the execution history indicates a number of times the second operation is not performed after the first operation is performed by the virtual object, and the processing circuitry is configured to turn on the assist function based on the number of times the second operation is not performed.

12. The information processing apparatus according to claim 9, wherein the processing circuitry is configured to:

automatically perform, via the assist function, the second operation by the virtual object after the first operation and based on the assist function being turned on and state information of the virtual object.

13. The information processing apparatus according to claim 12, wherein the first operation causes the virtual object to enter a drifting state, and the second operation causes the virtual object to exit the drifting state.

14. The information processing apparatus according to claim 13, wherein the state information indicates an angle of the virtual object relative to a track in the virtual environment, and the processing circuitry is configured to automatically perform, via the assist function, the second operation by the virtual object after the first operation and based on the assist function being turned on and the angle of the virtual object relative to the track being greater than a preset angle.

15. The information processing apparatus according to claim 12, wherein the first operation is a shooting operation, and the second operation is a reloading operation.

16. The information processing apparatus according to claim 15, wherein the state information indicates a remaining amount of projectiles for the shooting operation, and the processing circuitry is configured to automatically perform, via the assist function, the reloading operation by the virtual object after the first operation causes the remaining amount of projectiles to reach a preset threshold and based on the assist function being turned on.

17. A non-transitory computer-readable storage medium storing instructions which when executed by a processor cause the processor to perform:

turning on an assist function based on an execution history of a second operation, which that is to be performed by a virtual object in a virtual environment after a first operation is performed by the virtual object, meeting a trigger condition, the turned-on assist function being configured to automatically control the virtual object to perform the second operation after the first operation;

receiving a first user input to perform the first operation by the virtual object; and automatically performing, via the assist function, the second operation by the virtual object after the first operation is performed by the virtual object and based on the assist function being turned on.

18. The non-transitory computer-readable storage medium according to claim 17, wherein the assist function is a game assist function.

19. The non-transitory computer-readable storage medium according to claim 17, wherein the execution history indicates a number of times the second operation is not performed after the first operation is performed by the virtual object, and the turning on the assist function includes turning on the assist function based on the number of times the second operation is not performed.

20. The non-transitory computer-readable storage medium according to claim 17, wherein the automatically performing comprises:

automatically performing, via the assist function, the second operation by the virtual object after the first operation and based on the assist function being turned on and state information of the virtual object.

* * * * *